(12) United States Patent
Ueda et al.

(10) Patent No.: US 10,628,140 B2
(45) Date of Patent: Apr. 21, 2020

(54) PROGRAM CODE GENERATION APPARATUS

(71) Applicant: Mitsubishi Electric Corporation, Tokyo (JP)

(72) Inventors: Takeshi Ueda, Tokyo (JP); Nobuhiro Kobayashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/336,791

(22) PCT Filed: Nov. 17, 2016

(86) PCT No.: PCT/JP2016/084077
§ 371 (c)(1),
(2) Date: Mar. 26, 2019

(87) PCT Pub. No.: WO2018/092237
PCT Pub. Date: May 24, 2018

(65) Prior Publication Data
US 2019/0272158 A1    Sep. 5, 2019

(51) Int. Cl.
*G06F 8/41*  (2018.01)
*G06F 9/445*  (2018.01)
(Continued)

(52) U.S. Cl.
CPC ............ *G06F 8/433* (2013.01); *G06F 8/34* (2013.01); *G06F 8/41* (2013.01); *G06F 9/44* (2013.01);
(Continued)

(58) Field of Classification Search
CPC ... G06F 8/34; G06F 8/41; G06F 8/433; G06F 9/44; G06F 9/445; G06F 9/44578; G06F 11/36
See application file for complete search history.

(56) References Cited

U.S. PATENT DOCUMENTS 5,970,244 A * 10/1999 Nagahashi ................ G06F 8/74
717/124
6,802,053 B1 * 10/2004 Dye .......................... G06F 8/34
717/113
(Continued)

FOREIGN PATENT DOCUMENTS

JP            H0762827 B2 *  7/1995  ........... G06F 9/4484
JP          2005-055951 A      3/2005
(Continued)

OTHER PUBLICATIONS

Singer, "Concept Assignment as a Debugging Technique for Code Generators", 2005, IEEE (Year: 2005).*
(Continued)

*Primary Examiner* — Wei Y Zhen
*Assistant Examiner* — Junchun Wu
(74) *Attorney, Agent, or Firm* — Birch, Stewart, Kolasch & Birch, LLP

(57) ABSTRACT

A block-diagram acquisition unit acquires a block diagram that defines by connection among a plurality of blocks, a data processing procedure to be reflected in a program code. An inconsistency inspection unit inspects whether there is an inconsistency in the data processing procedure defined in the block diagram by tracing the connection among blocks in the block diagram.

9 Claims, 16 Drawing Sheets

(51) Int. Cl.
　　　*G06F 11/36* (2006.01)
　　　*G06F 8/34* (2018.01)
　　　*G06F 9/44* (2018.01)
(52) U.S. Cl.
　　　CPC .......... *G06F 9/445* (2013.01); *G06F 9/44578* (2013.01); *G06F 11/36* (2013.01)

(56) References Cited

U.S. PATENT DOCUMENTS

| | | | |
|---|---|---|---|
| 8,533,659 B2 * | 9/2013 | Joukov | G06F 11/3692 717/101 |
| 8,978,010 B1 * | 3/2015 | Thumfart | G06F 8/433 717/123 |
| 9,189,233 B2 * | 11/2015 | Sasanka | G06F 9/30098 |
| 10,445,072 B1 * | 10/2019 | Darnell | G06F 8/35 |
| 2006/0143596 A1 * | 6/2006 | Miyashita | G06F 8/433 717/131 |
| 2009/0199157 A1 * | 8/2009 | Ishii | G06F 8/34 717/105 |
| 2010/0083240 A1 | 4/2010 | Siman | |
| 2010/0333201 A1 | 12/2010 | Haviv et al. | |
| 2011/0119681 A1 * | 5/2011 | Spencer | G06F 8/00 718/106 |
| 2013/0133076 A1 | 5/2013 | Kawashiro et al. | |
| 2013/0167241 A1 | 6/2013 | Siman | |
| 2014/0047421 A1 * | 2/2014 | Shimizu | G06F 17/12 717/149 |
| 2014/0337829 A1 * | 11/2014 | Ito | H04L 12/40169 717/175 |
| 2015/0169295 A1 * | 6/2015 | Kyoso | G06F 8/34 717/109 |
| 2015/0332055 A1 | 11/2015 | Siman | |
| 2016/0378445 A1 * | 12/2016 | Kashiwagi | G06F 16/245 717/143 |

FOREIGN PATENT DOCUMENTS

| | | |
|---|---|---|
| JP | 2006-301989 A | 11/2006 |
| JP | 2010-507165 A | 3/2010 |
| JP | 2010-102362 A | 5/2010 |
| JP | 2010204855 A * | 9/2010 |
| JP | 2011-013810 A | 1/2011 |
| JP | 2011-013887 A | 1/2011 |
| JP | 2011-086200 A | 4/2011 |
| JP | 4702194 B2 * | 6/2011 |
| JP | 2011-150716 A | 8/2011 |
| JP | 2012-027618 A | 2/2012 |
| JP | 2012-164177 A | 8/2012 |
| JP | 2013061893 A * | 4/2013 |
| JP | 2016-057715 A | 4/2016 |

OTHER PUBLICATIONS

Wong et al., "Effective program debugging based on execution slices and inter-block data dependency", 2005, Elsevier Inc. (Year: 2005).*

Cytron et al., "Efficiently Computing Static Single Assignment Form and the Control Dependence Graph", 1991, ACM, VO1 13, No. 4, pp. 451.490 (Year: 1991).*

Hu et al., "Locating Software Faults Based on Control Flow and Data Dependence", Dec. 2014, Journal of Computers, vol. 9, No. 12 (Year: 2014).*

Ottenstein et al., "The program dependence graph in a software development environment", 1984, ACM (Year: 1984).*

International Search Report for PCT/JP2016/084077 (PCT/ISA/210) dated Jan. 31, 2017.

* cited by examiner

Fig. 6

| TYPE 601 | NUMBER OF DATA INPUTS 602 | NUMBER OF DATA OUTPUTS 603 | NUMBER OF CONTROL INPUTS 604 | NUMBER OF CONTROL OUTPUTS 605 | ATTRIBUTE 606 |
|---|---|---|---|---|---|
| Input (611) | 0 | 1 | 0 | 0 | OutputDataType, OutputMin, OutputMax, ... |
| Output (612) | ONE OR MORE | 0 | 0 | 0 | InputDataType, InputMin, InputMax, ... |
| If (613) | 1 | 0 | 0 | 2 | IfExpression, ... |
| Subsystem (614) | ONE OR MORE | 1 | ONE OR MORE | 0 | RefSubsystem |
| Sum (615) | ONE OR MORE | 1 | 0 | 0 | InputDataType, InputMin, InputMax, ... |

| TARGET | STARTING POINT | END POINT | INSPECTION ITEM |
|---|---|---|---|
| Block | ARBITRARY | NONE | DataType HAS NOT BEEN SET. |
| DataSlice | Output | ARBITRARY | DataType OF ANY BLOCK IN PATH IS DIFFERENT FROM THAT OF STARTING POINT |
| Slice | Output | ARBITRARY | Min OR Max IS DIFFERENT AMONG PATHS |

Fig. 8

| ITEM | CONVERSION RULE |
|---|---|
| HEADER FILE NAME | FILE NAME OF BLOCK DIAGRAM (EXCLUDING EXTENSION).h |
| SOURCE FILE NAME | FILE NAME OF BLOCK DIAGRAM (EXCLUDING EXTENSION).c |
| FUNCTION NAME | FILE NAME OF BLOCK DIAGRAM (EXCLUDING EXTENSION) |
| INPUT DATA | IN STRUCTURE |
| OUTPUT DATA | OUT STRUCTURE |

Fig. 9

| TYPE OF BLOCK | CONVERSION RULE |
|---|---|
| Input | • LANGUAGE TYPE: MEMBER OF IN STRUCTURE<br>• MEMBER NAME: VALUE OF name ATTRIBUTE (WHEN OVERLAPPING ON EACH OTHER, ADD "_" AND ID ATTRIBUTE AT END)<br>• DATA TYPE: VALUE OF type ATTRIBUTE |
| Output | • LANGUAGE TYPE: MEMBER OF OUT STRUCTURE<br>• MEMBER NAME: VALUE OF name ATTRIBUTE (WHEN OVERLAPPING ON EACH OTHER, ADD "_" AND ID ATTRIBUTE AT END)<br>• DATA TYPE: VALUE OF type ATTRIBUTE |
| Sum | • LANGUAGE TYPE: SUMMATION OPERATION<br>⟨OUT⟩ = ⟨IN1⟩ + ⟨IN2⟩ |

Fig. 10

```
typedef struct {
    int8   In1;
    uint8  In2;
    uint8  In3;
    uint8  In4;
    uint8  In5,
} IN;
```
~1001

```
typedef struct {
    int8 Out1;
} OUT;
```
~1002 void sample(void); ~1003

```
void sample(void)
{
    uint8 sum;
    if (IN.In1 > 0) {
        sum = (uint8) ((uint32) IN. In2 + IN. In3) ;
    } else {
        sum= (uint8) ((uint32) IN. In4 + IN. In5) ;
    }
    rtY.Out1 = sum;
}
```
1100

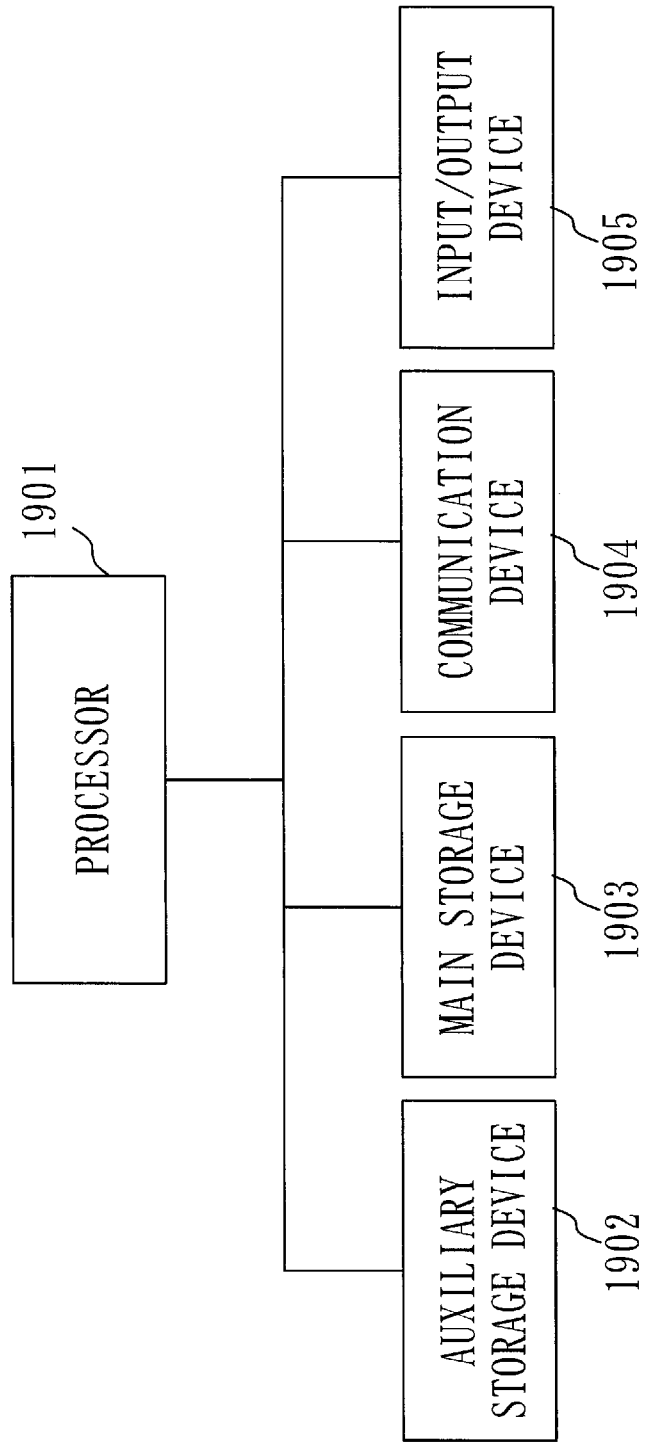

PROGRAM CODE GENERATION APPARATUS

TECHNICAL FIELD

The present invention relates to a program code generation apparatus, a program code generation method, and a program code generation program.

BACKGROUND ART

There is a method of automatically generating a program code such as a source code based on a program specification generated in advance. For example, there is a method of generating a program code from a block diagram. The block diagram is constituted by a plurality of blocks and a connection line connecting the blocks to one another. In each block, elements of a data processing procedure are defined. Specifically, a group of data processes are defined in each block. In the block diagram, by connecting the blocks to one another by the connection line, there is described a flow of the data processing procedure in a program from acquiring an input value until outputting an output value indicating a calculation result.

As a technique of generating a program code from a block diagram, for example, there is a technique disclosed in Patent Literature 1.

CITATION LIST

Patent Literature

Patent Literature 1: JP 2011-13887 A
Patent Literature 2: JP 2016-57715 A

SUMMARY OF INVENTION

Technical Problem

In Patent Literatures 1 and 2, a generated block diagram is compared with patterns of an inappropriate block diagram, and if the generated block diagram matches any pattern of the inappropriate block diagram, it is notified that the generated block diagram is inappropriate.

Thus, in the techniques of Patent Literatures 1 and 2, there is a problem that patterns of the inappropriate block diagram need to be prepared in advance in order to detect an inappropriate block diagram.

A main object of the present invention is to solve such a problem. That is, the main object of the present invention is to obtain a configuration that can detect an inappropriate block diagram without preparing patterns of the inappropriate block diagram in advance.

Solution to Problem

A program code generation apparatus according to the present invention includes:
a block-diagram acquisition unit to acquire a block diagram that defines by connection among a plurality of blocks, a data processing procedure to be reflected in a program code; and
an inconsistency inspection unit to inspect whether there is an inconsistency in the data processing procedure defined in the block diagram by tracing the connection among blocks in the block diagram.

Advantageous Effects of Invention

In the present invention, it is inspected whether there is an inconsistency in a data processing procedure by tracing connection among blocks in a block diagram. Therefore, according to the present invention, an inappropriate block diagram can be detected without preparing patterns of the inappropriate block diagram in advance.

BRIEF DESCRIPTION OF DRAWINGS

FIG. 6 is a diagram illustrating an example of an analysis rule according to the first embodiment.
FIG. 7 is a diagram illustrating an example of an inspection rule according to the first embodiment.
FIG. 8 is a diagram illustrating an example of a code generation rule according to the first embodiment.
FIG. 9 is a diagram illustrating an example of the code generation rule according to the first embodiment.
FIG. 10 is a diagram illustrating an example of a program code according to the first embodiment.
FIG. 11 is a diagram illustrating an example of the program code according to the first embodiment.
FIG. 16 is a diagram illustrating a hardware configuration example of the program code generation apparatus according to the first embodiment.

DESCRIPTION OF EMBODIMENTS

Embodiments of the present invention will be explained below with reference to drawings. In the following descriptions of the embodiments and the drawings, elements denoted by the same reference signs indicate the same or corresponding parts.

First Embodiment

Descriptions of Configurations

Figure 1:
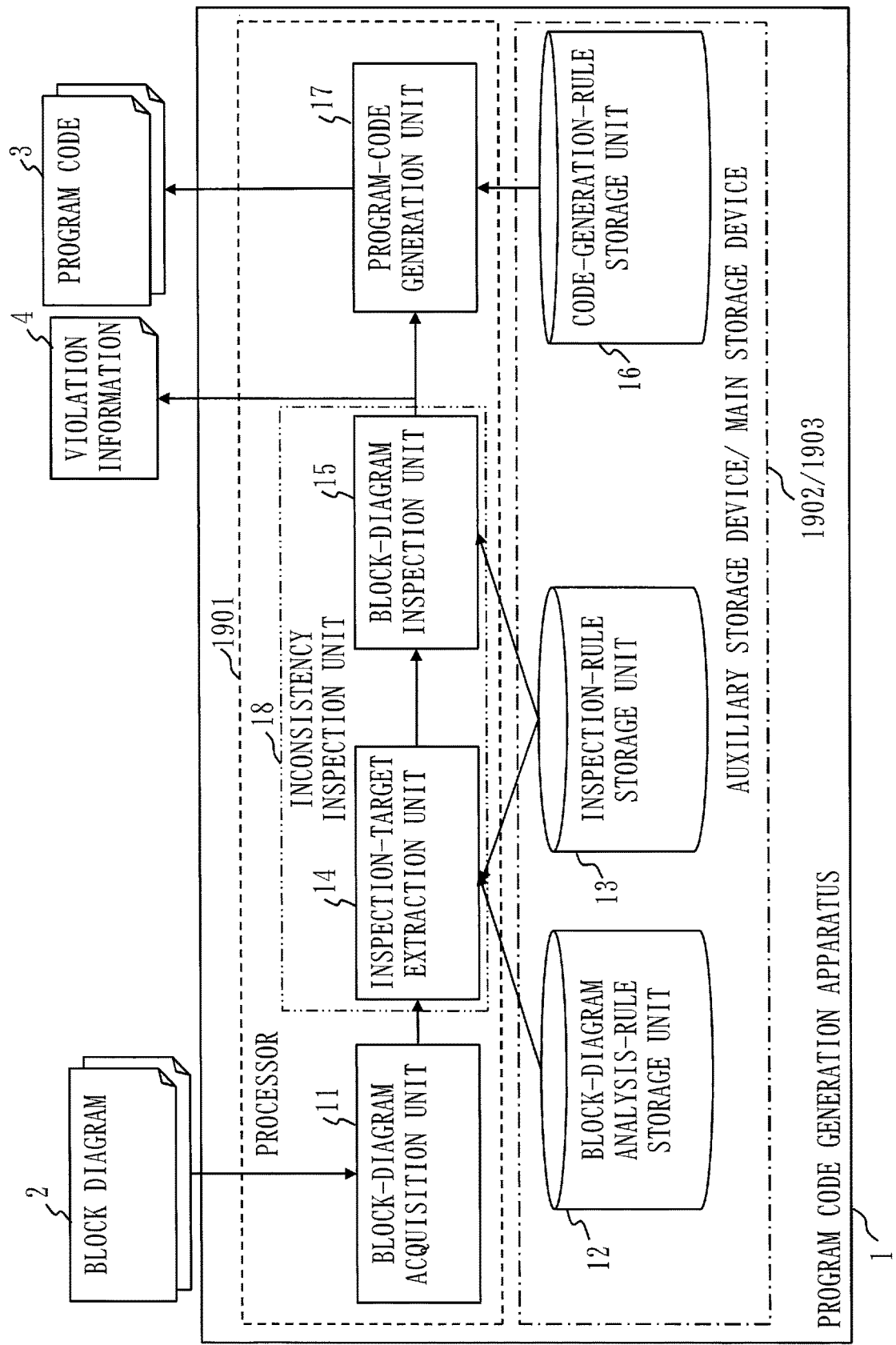
FIG. 1 is a diagram illustrating a functional configuration example of a program code generation apparatus according to a first embodiment.

FIG. 1 illustrates a functional configuration example of a program code generation apparatus 1 according to the present embodiment.

FIG. 16 illustrates a hardware configuration example of the program code generation apparatus 1 according to the present embodiment.

The hardware configuration example of the program code generation apparatus 1 is described first with reference to FIG. 16, and then the functional configuration example of the program code generation apparatus 1 is described with reference to FIG. 1.

An operation performed by the program code generation apparatus 1 corresponds to a program code generation method and a program code generation program.

The program code generation apparatus 1 is a computer.

The program code generation apparatus 1 includes as hardware a processor 1901, an auxiliary storage device 1902, a main storage device 1903, a communication device 1904, and an input/output device 1905.

Programs for realizing functions of a block-diagram acquisition unit 11, an inspection-target extraction unit 14, a block-diagram inspection unit 15, and a program-code generation unit 17 illustrated in FIG. 1 are stored in the auxiliary storage device 1902.

These programs are loaded from the auxiliary storage device 1902 to the main storage device 1903, and the processor 1901 executes these programs to perform operations of the block-diagram acquisition unit 11, the inspection-target extraction unit 14, the block-diagram inspection unit 15, and the program-code generation unit 17 described later.

In FIG. 1, a state in which the processor 1901 is executing the programs for realizing functions of the block-diagram acquisition unit 11, the inspection-target extraction unit 14, the block-diagram inspection unit 15, and the program-code generation unit 17 is schematically illustrated.

Further, the auxiliary storage device 1902 realizes a block-diagram analysis-rule storage unit 12, an inspection-rule storage unit 13, and a code-generation-rule storage unit 16 illustrated in FIG. 1. At least any one of the block-diagram analysis-rule storage unit 12, the inspection-rule storage unit 13, and the code-generation-rule storage unit 16 can be realized by the main storage device 1903.

The communication device 1904 is used when the program code generation apparatus 1 performs communication with an external device. If the program code generation apparatus 1 does not perform communication with the external device, the communication device 1904 can be omitted.

The input/output device 1905 acquires an instruction from a user of the program code generation apparatus 1, a block diagram 2, and the like. The input/output device 1905 presents a program code 3 or violation information 4 to the program code generation apparatus 1.

The functional configuration example of the program code generation apparatus 1 is described next with reference to FIG. 1.

The block-diagram acquisition unit 11 acquires the block diagram 2 via the input/output device 1905.

The block diagram 2 is data defining a data processing procedure to be reflected in the program code by the connection of a plurality of blocks. That is, the block diagram 2 is mainly constituted by a plurality of blocks and connection lines connecting the respective blocks to one another. A processing procedure element, which is an element of the data processing procedure, is allocated to each of the blocks in the block diagram 2. The processing procedure element is a group of data processes.

The block-diagram acquisition unit 11 can acquire a plurality of block diagrams 2.

The operation performed by the block-diagram acquisition unit 11 corresponds to a block diagram acquisition process.

The block-diagram analysis-rule storage unit 12 stores therein an analysis rule. The analysis rule is used when the inspection-target extraction unit 14 analyzes the structure of the block diagram.

In the present embodiment, it is assumed that the block-diagram analysis-rule storage unit 12 holds the analysis rule. However, the analysis rule can be included in the block diagram 2.

The inspection-rule storage unit 13 stores therein an inspection rule. The inspection rule is used when the block-diagram inspection unit 15 inspects whether there is an inconsistency in the data processing procedure defined in the block diagram 2.

The inspection-rule storage unit 13 can store therein a plurality of inspection rules.

The inspection-target extraction unit 14 extracts a block and a connection line to be inspected from the block diagram 2 by tracing connection among the blocks in the block diagram 2 based on the analysis rule and the inspection rule.

More specifically, the inspection-target extraction unit 14 sets any block of the blocks as a starting block. The inspection-target extraction unit 14 then traces the connection among the blocks from the starting block in the block diagram 2 to extract a block on which the starting block depends as a dependency destination block. Further, the inspection-target extraction unit 14 repeats an operation to extract a block on which the extracted dependency destination block depends as a dependency destination block, thereby extracting a dependency destination block on which the starting block depends directly and indirectly.

The block-diagram inspection unit 15 applies the inspection rule to the block and the connection line extracted by the inspection-target extraction unit 14 to inspect whether there is an inconsistency in the data processing procedure defined in the block diagram 2. That is, the block-diagram inspection unit 15 inspects whether there is a part violating the inspection rule in the block diagram 2.

For example, the block-diagram inspection unit 15 inspects whether there is an inconsistency in at least a data type, a maximum value, and a minimum value between the processing procedure elements allocated to the starting block and the processing procedure elements allocated to the dependency destination block.

Further, if there is an inconsistency in the data processing procedure defined in the block diagram 2, the block-diagram inspection unit 15 outputs the violation information 4 notifying the inconsistency in the data processing procedure via the input/output device 1905.

The inspection-target extraction unit 14 and the block-diagram inspection unit 15 are collectively referred to as inconsistency inspection unit 18.

That is, the inspection-target extraction unit 14 and the block-diagram inspection unit 15 as the inconsistency inspection unit 18 trace the connection among the blocks in the block diagram 2 to inspect whether there is an inconsistency in the data processing procedure defined in the block diagram 2. The operation performed by the inconsistency inspection unit 18 corresponds to an inconsistency inspection process.

The code-generation-rule storage unit 16 stores therein a code generation rule. The code generation rule is used by the program-code generation unit 17 at the time of generating the program code 3 from the block diagram 2.

The program-code generation unit 17 generates the program code 3 from the block diagram 2 based on the code generation rule.

That is, when there is no inconsistency in the data processing procedure defined in the block diagram 2, the program-code generation unit 17 generates a program code reflecting the data processing procedure defined in the block diagram 2 from the block diagram 2. The program code is described in a computer language.

*Descriptions of Operations*

An operation example of the program code generation apparatus 1 is described next with reference to the flowchart in FIG. 2.

First, the block-diagram acquisition unit 11 acquires the block diagram 2 via the input/output device 1905 (Step S1).

Next, the inspection-target extraction unit 14 extracts information of an inspection target from the block diagram 2 by applying the analysis rule stored in the block-diagram analysis-rule storage unit 12 and the inspection rule stored in the inspection-rule storage unit 13 to the block diagram 2 (Step S2). Details in Step S2 are described later.

Next, the block-diagram inspection unit 15 inspects whether there is an inconsistency in a data processing procedure defined in the block diagram 2 by applying the inspection rule stored in the inspection-rule storage unit 13 to the information of the inspection target extracted by the inspection-target extraction unit 14 (Step S3). Details in Step S3 are described later.

As a result of inspection in Step S3, if there is no inconsistency in the data processing procedure defined in the block diagram 2 (YES in Step S4), the program-code generation unit 17 generates the program code 3 by applying the code generation rule stored in the code-generation-rule storage unit 16 to the block diagram 2 (Step S5). Details in Step S5 are described later.

On the other hand, if there is an inconsistency in the data processing procedure defined in the block diagram 2 (NO in Step S4), the block-diagram inspection unit 15 outputs violation information 4 notifying the inconsistency in the data processing procedure from the input/output device 1905 (Step S6). The format of the violation information 4 is described later.

In this manner, in the present embodiment, the program code generation apparatus 1 inspects whether the block diagram 2 is appropriate, and if the block diagram 2 is appropriate, the program code generation apparatus 1 generates the program code 3.

Next, details of the block diagram 2, the analysis rule stored in the block-diagram analysis-rule storage unit 12, the inspection rule stored in the inspection-rule storage unit 13, the code generation rule stored in the code-generation-rule storage unit 16, the program code 3, and the violation information 4 are described.

(Example of Block Diagram)

The block diagram 2 is a file including not only information representing only an appearance of the block diagram such as an image file, but also information required for drawing a program as the block diagram on a development tool, and additional pieces of information for performing simulation and automatic code generation. The block diagram 2 is realized as a file including data that can represent a hierarchical data structure, for example, XML (Extensible Markup Language) and JSON (JavaScript (registered trademark) Object Notation). However, in order to facilitate the understanding, the block diagram 2 is represented below not in the XML or JSON format, but in a format in which a plurality of blocks are connected to one another by connection lines. The block diagram 2 represents additional information with a balloon or the like as necessary.

Figure 3:
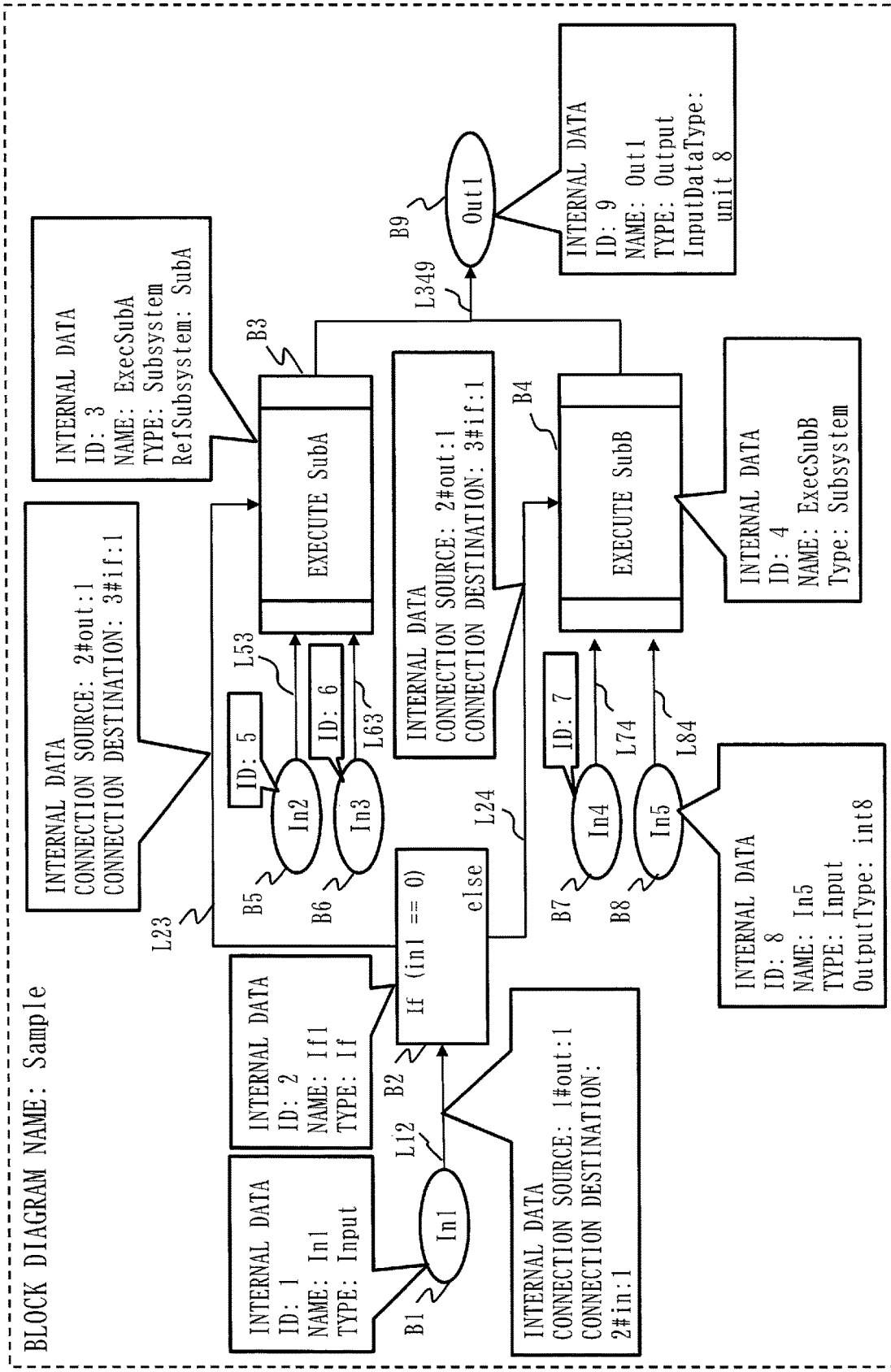
FIG. 3 is a diagram illustrating an example of a block diagram according to the first embodiment.
Figure 4:
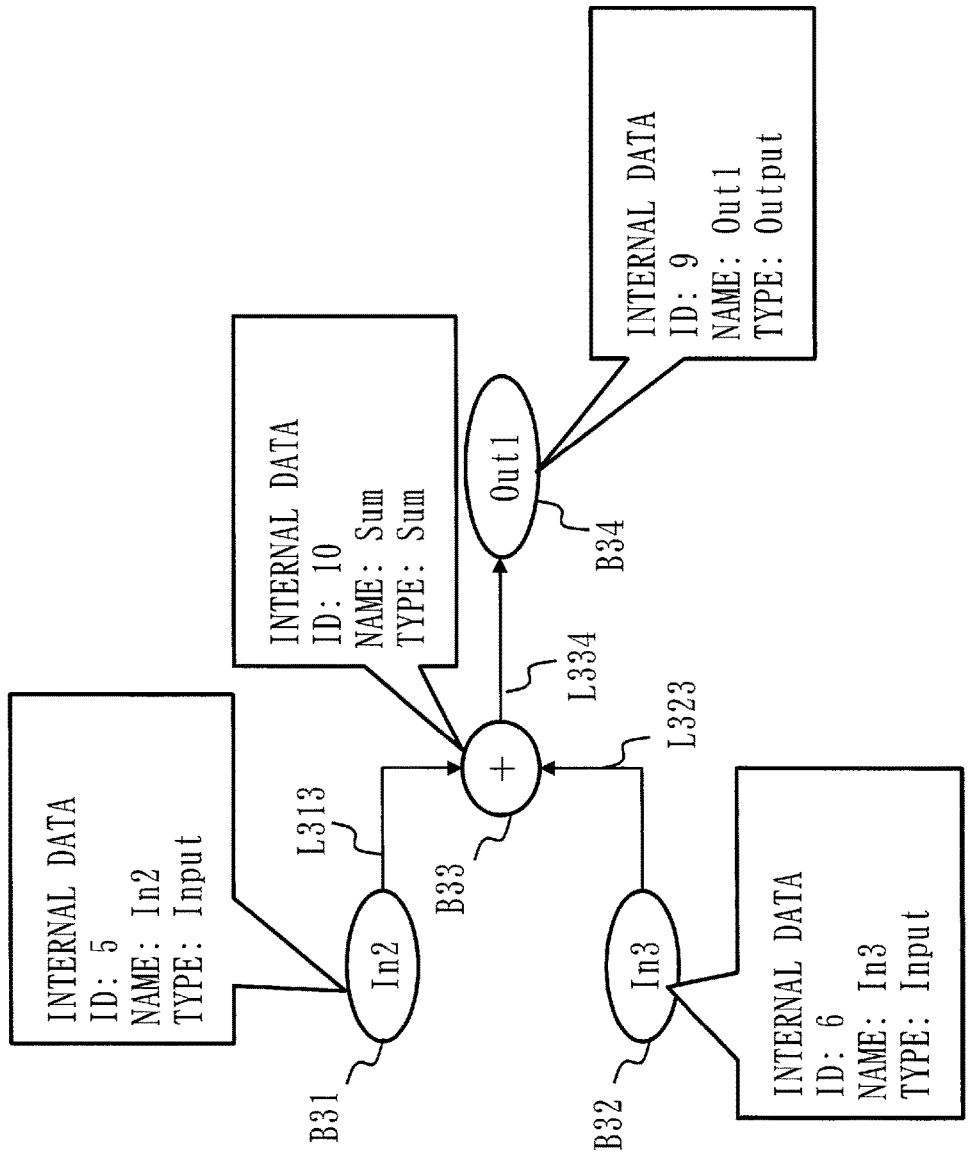
FIG. 4 is a diagram illustrating an example of SubA according to the first embodiment.
Figure 5:
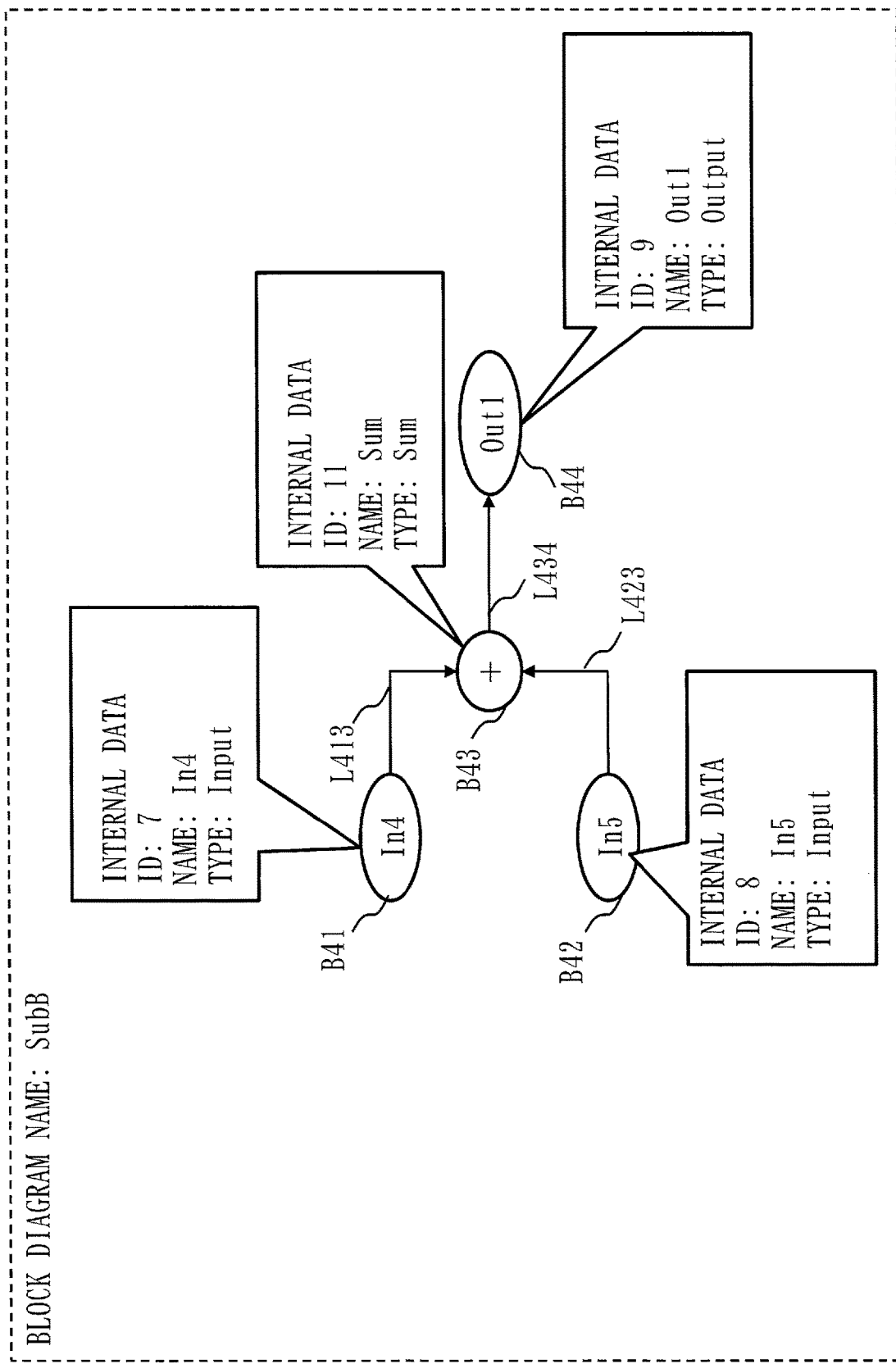
FIG. 5 is a diagram illustrating an example of SubB according to the first embodiment.

FIGS. 3 to 5 illustrate examples of the block diagram 2.

FIG. 3 illustrates the block diagram 2 in which a data processing procedure to be reflected in a program code is defined. FIG. 4 illustrates details of SubA that is a subroutine included the block diagram 2 in FIG. 3. FIG. 5 illustrates details of SubB that is a subroutine included the block diagram 2 in FIG. 3.

In FIG. 3, elements added with reference signs B1 to B9 indicate blocks. Elements added with reference signs L12, L23, L24, L53, L63, L74, L84, and L349 indicate connection lines.

In FIG. 4, elements added with reference signs B31 to B34 indicate blocks. Elements added with reference signs L313, L323, and L334 indicate connection lines.

Further, in FIG. 5, elements added with reference signs B41 to B44 indicate blocks. Elements added with reference signs L413, L423, and L434 indicate connection lines.

The blocks and connection lines in FIG. 3 are described below. However, the following descriptions are also applied to the blocks and connection lines in FIGS. 4 and 5.

Internal data is set in each block. The internal data includes, for example, an ID (identifier) of a block, a name of the block, and a type of the block. The content included in the internal data set in each block is the processing procedure element.

For example, the ID of the block B1 is 1, the name of the block B1 is In1, and the type of the block B1 is Input. The ID is a number or a character string for uniquely identifying each block. In the present embodiment, the ID is a unique number. The name is arbitrarily added so that a user of the program code generation apparatus 1 can identify each block easily at the time of displaying the block diagram 2 on a display. The type of the block is used for identifying characteristics of data processing allocated to each block. For example, as the type of the block, there are input, output, summation, if branch, subsystem, and the like. As an identifier representing the type of the block, a plurality of numbers and character strings are defined in advance.

For example, in the block B1, "Input" is set as the type, and an input process is allocated to the block B1 as the processing procedure element. A block to which an input process is allocated is hereinafter referred to as input block.

Further, in the block B9, "Output" is set as the type, and an output process is allocated to the block B9 as the processing procedure element. A block to which an output process is allocated is hereinafter referred to as output block.

In the following descriptions, a block to which a summation operation process is allocated as the processing procedure element (a block whose type is "Sum") is referred to as Sum block. The Sum block is not illustrated in FIG. 3.

A block to which if a branching process is allocated as the processing procedure element (a block whose type is "If") is referred to as if block.

A block to which a subsystem is allocated as the processing procedure element (a block whose type is "Subsystem") is referred to as Subsystem block.

Further, although not illustrated in FIG. 3, the internal data also includes attribute information required for eventually generating the program code 3 from the block diagram 2. For example, the internal data of the input block includes as the attribute information a data type of the input data, a maximum value and/or minimum value of the input data, and the like. Further, in a block representing a control structure such as the if block, the internal data includes conditions for executing the control, and information related to the next process when the conditions are matched, as the attribute information.

The connection line is a line connecting arbitrary two blocks to one another. The connection line is a directed line indicating a processing flow or a data flow. In the connection line, IDs of two blocks connected to one another by the connection line and information related to the direction of the processing flow or the data flow are set as the internal data. The internal data of the connection line includes an ID of a block at a connection source and an ID of a block at a connection destination. When the block at the connection source includes a plurality of output ports, or the block at the connection destination includes a plurality of input ports, the internal data of the connection line also includes IDs of the ports in the block. For example, "connection source: 1# out:1" and "connection destination: 2# in:1" are described in the internal data of the connection line L12. This means that the connection line L12 connects an output port 1 of the block B1 to an input port 1 of the block B2.

Further, since the ID of the block at the connection source and the ID of the block at the connection destination are described in the internal data of the connection line, the block-diagram inspection unit 15 can identify the data flow and the processing flow between the blocks.

For example, the block-diagram inspection unit 15 can specify that data output from the input block B1 is input to an If block B2 by referring to the internal data of the connection line L12.

In this manner, the block-diagram inspection unit 15 can specify a connection relation between blocks in the block diagram 2 by referring to the internal data of the connection line included in the block diagram 2.

The block-diagram inspection unit 15 analyzes the connection relation between the blocks and the data processing allocated to each block to inspect whether there is an inconsistency in the data processing procedure defined in the block diagram 2.

The connection line can be identified by the ID of the block at the connection source and the ID of the block at the connection destination. Therefore, in the present embodiment, the ID is not set to the connection line. The ID can be also set to the connection line.

(Example of Analysis Rule)

Next, the analysis rule stored in the block-diagram analysis-rule storage unit 12 is described.

FIG. 6 illustrates an example of the analysis rule.

In an analysis rule 600 in FIG. 6, information acquired from a block is defined for each type of the block.

For example, the analysis rule 600 in FIG. 6 includes a type 601, a number of data inputs 602, a number of data outputs 603, a number of control inputs 604, a number of control outputs 605, and an attribute 606.

The type 601 represents a type of a block.

The number of data inputs 602 represents the number of pieces of data to be input to a block. When "one or more" is described in the number of data inputs 602, the number of pieces of data to be input to a block is variable.

The number of data outputs 603 represents the number of pieces of data to be output from a block.

The number of control inputs 604 represents the number of inputs regarding control of processing. For example, in Subsystem 614, the number of control inputs 604 is defined as "one or more". This means that one or more control results in an If block are input to the Subsystem block. When "one or more" is described, the number of control results to be input to a block is variable.

The control output 605 represents the number of outputs regarding control of processing. For example, in If 613, the number of control outputs 605 is defined as "2". This means that two control results in the If block are output.

The attribute 606 indicates an attribute supported by a block.

In FIG. 6, the analysis rule 600 described in a natural language is illustrated to simplify the explanation. However, the analysis rule 600 can be described in a program language.

(Example of Inspection Rule)

Next, the inspection rule stored in the inspection-rule storage unit 13 is described.

FIG. 7 illustrates an example of the inspection rule.

A rule for detecting an inconsistency in the data processing procedure defined in the block diagram 2 is described in an inspection rule 700 in FIG. 7.

For example, the inspection rule 700 in FIG. 7 includes a target 701, a starting point 702, an end point 703, and an inspection item 704.

The target 701 represents the type of an inspection target.

Block 711 represents an inspection item with respect to each block.

DataSlice 712 represents an inspection item with respect to a data slice.

Slice 713 represents an inspection item with respect to a slice.

The data slice indicates a slice extracted by taking only a data dependence relation into consideration, without considering a control dependence relation. In the present embodiment, when an execution result of data processing allocated to a certain block (referred to as "block α") affects execution of data processing allocated to another block (referred to as "block β"), it is said that the block β has "control dependence relation" with the block α. The block α is a dependence destination block of the block β. For example, in FIG. 3, the block B3 has the "control dependence relation" with the block B2. That is, the block B2 is the dependence destination block of the block B3.

Further, the "data dependence relation" means that data output from a certain block (referred to as "block α") reaches another block (referred to as "block β"). For example, in FIG. 3, since data output from the block B1 is input to the block B2, the block B2 has the data dependence relation with the block B1. That is, the block B1 is the dependence destination block of the block B2.

"Slice" is an aggregate of blocks (and the connection relation among the blocks) having the control dependence relation and the data dependence relation with a certain block. That is, the slice is an aggregate of blocks (and the connection relation among the blocks) acquired by tracing from a certain block, blocks having the control dependence relation with the certain block, and an aggregate of blocks (and the connection relation among the blocks) acquired by tracing from the certain block, blocks having the data dependence relation with the certain block. In other words, the slice is an aggregate of all the blocks (and the connection relation among the blocks) associated with the certain block.

"The slice extracted by taking only the data dependence relation into consideration, without considering the control dependence relation" means a slice that can be constructed without the control dependence relation.

That is, the data slice is an aggregate of blocks (and the connection relation among the blocks) acquired by tracing from a certain block, only a block having the data dependence relation with the certain block.

The starting point 702 represents the type of the block that becomes a starting point at the time of searching for the control dependence relation or the data dependence relation.

In FIG. 7, "Output" is described as the starting point 702 with respect to the DataSlice 712 and the Slice 713. Therefore, the block-diagram inspection unit 15 obtains a data slice by tracking from a block whose type is "Output", blocks having the data dependence relation with the block whose type is "Output". Further, the block-diagram inspection unit 15 obtains a slice by tracing from the block whose type is "Output", blocks having the data dependence relation and the control dependence relation with the block whose type is "Output".

The end point 703 represents the type of a block at which a search for the control dependence relation or the data dependence relation is terminated. The block-diagram inspection unit 15 continues searching for the control dependence relation or the data dependence relation until the control dependence relation or the data dependence relation cannot be searched for anymore, that is, until the block-diagram inspection unit 15 reaches an input block. However, when a search by the block-diagram inspection unit 15 is to be terminated at a block of a specific type, the corresponding type is defined in a column of the end point 703. For example, when a slice from an output block to an If block is to be acquired, "If" is set in the end point 703.

The inspection item 704 indicates inspection contents with respect to the extracted inspection target.

For example, in the Block 711, when DataType has not been set in a block in which the DataType can be set, the block-diagram inspection unit 15 determines that there is an inconsistency in the data processing procedure described in the block diagram 2.

In the DataSlice 712, when the DataType of any block included in a path of the data slice is different from the DataType of a block at the starting point, the block-diagram inspection unit 15 determines that there is an inconsistency in the data processing procedure described in the block diagram 2.

Further, in the Slice 713, when there are a plurality of paths in one slice, and if any of Min (minimum value) and Max (maximum value) is different among the paths, the block-diagram inspection unit 15 determines that there is an inconsistency in the data processing procedure described in the block diagram 2.

In FIG. 7, the inspection rule 700 described in the natural language is illustrated to simplify the explanation. However, the inspection rule 700 can be described in a program language.

(Code Generation Rule)

Next, the code generation rule stored in the code-generation-rule storage unit 16 is described.

FIGS. 8 and 9 illustrate examples of the code generation rule.

In a code generation rule 800 in FIG. 8 and a code generation rule 900 in FIG. 9, information required for generating the program code 3 is described based on the pieces of information included in the block diagram 2. In the present embodiment, there are two code generation rules having different roles, that is, the code generation rule 800 and the code generation rule 900. More specifically, the code generation rule 800 is a general code generation rule not associated with the representation of the block diagram 2. The code generation rule 900 is a code generation rule associated with the representation of the block diagram 2.

In the code generation rule 800 in FIG. 8, a pair of a general item 801 regarding the program code and a conversion rule 802 thereof are described. Further, in the code generation rule 800, regarding an item of, for example, "function name", it is described in the conversion rule 802 that a file name of a block diagram excluding an extension is used.

Further, in the code generation rule 900, a pair of block type 901 representing the type of each block and a conversion rule 902 thereof are described. In the code generation rule 900, as a conversion rule with respect to a block whose block type 901 is "Input", it is described that the language type is a member of an IN structure, the member name is a value of a name attribute, and the data type is a value of a type attribute.

The program-code generation unit 17 generates the program code 3 from the block diagram 2, based on these code generation rules 800 and 900.

In FIGS. 8 and 9, the code generation rules 800 and 900 described in the natural language are illustrated to simplify the explanation. However, the code generation rules 800 and 900 can be described in a program language.

(Example of Program Code)

Next, the program code 3 generated by the program-code generation unit 17 is described.

FIGS. 10 and 11 illustrate examples of the program code 3.

A program code illustrated in FIG. 10 is referred to as program code 1000, and a program code illustrated in FIG. 11 is referred to as program code 1100. The program code 1000 is a header file, and the program code 1100 is a source file.

The program code 1000 and the program code 1100 are both described in C language. In the program code 1000 in FIG. 10, the IN structure that handles all the inputs is defined (reference sign 1001 in FIG. 10). An OUT structure representing an output is also defined therein (reference sign 1002 in FIG. 10). A prototype declaration of a function sample is also defined therein (reference sign 1003 in FIG. 10). Further, in the program code 1100, a code generated from the block diagram 2 is described.

(Example of Violation Information)

Next, the violation information 4 output by the block-diagram inspection unit 15 is described.

Figure 12:
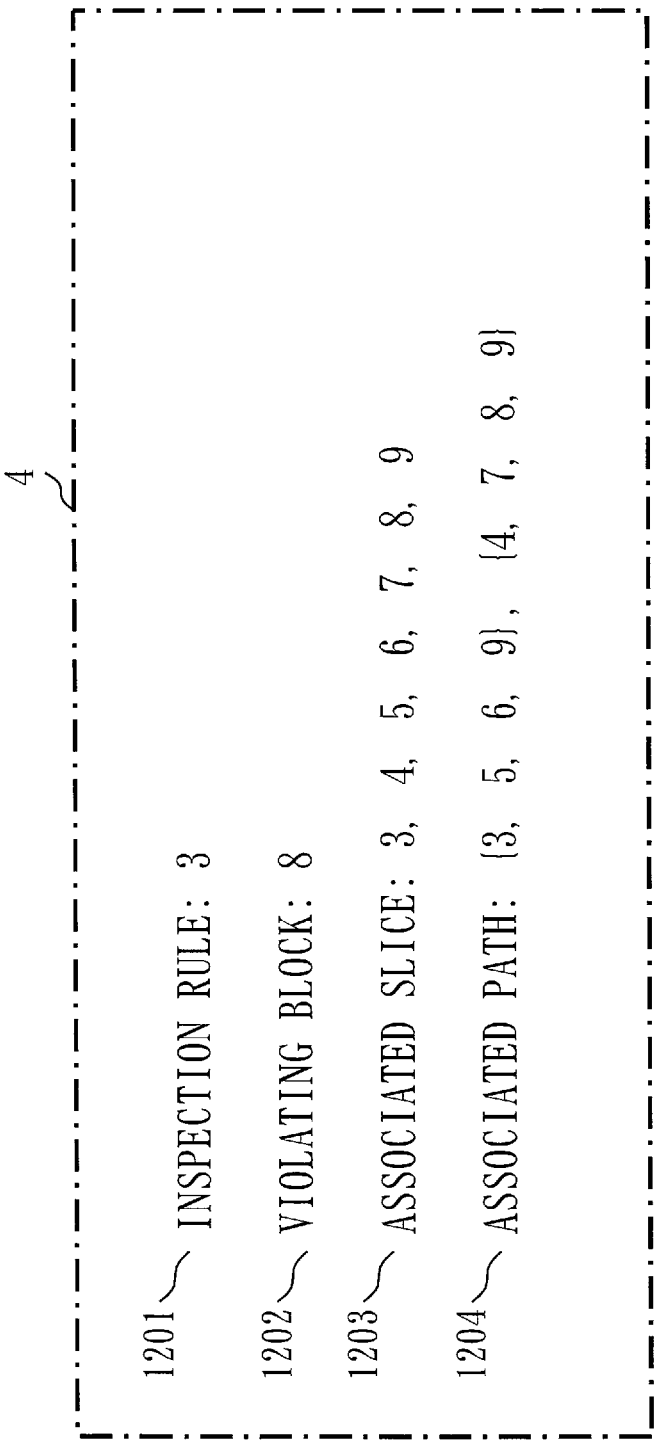
FIG. 12 is a diagram illustrating an example of violation information according to the first embodiment.

FIG. 12 illustrates an example of the violation information 4.

The violation information 4 includes an inconsistency in the data processing procedure, that is, information for notifying a part in the block diagram 2 where an inconsistency has occurred.

For example, as illustrated in FIG. 12, there are an inspection rule 1201, a violating block 1202, an associated slice 1203, and an associated path 1204 in the violation information 4.

In the inspection rule 1201, when there are a plurality of inspection rules 700, the number of the inspection rule 700 used at the time of detecting the violation is indicated.

In the violation block 1202, an ID of a block including a violation is indicated.

In the associated slice 1203, when a violation has been detected in the inspection of the Slice 713 included in the inspection rule 700, IDs of blocks included in the slice in which the violation has been detected are listed.

In the associated path 1204, when a violation has been detected in the inspection of the Slice 713 included in the inspection rule 700, paths included in the slice are indicated. The number in one { } indicates one path.

The violation information 4 can be in a format different from the format illustrated in FIG. 12, in which the presence or absence of violation can be listed for each inspection item 704 in the inspection rule 700. For example, "YES" can be displayed in the inspection item 704 having no violation, and "NO" can be displayed in the inspection item 704 having a violation.

Further, in order to notify a user of the program code generation apparatus 1 of a violation content more clearly, an explanatory text for explaining the violation content can be added to the violation information 4.

Figure 2:
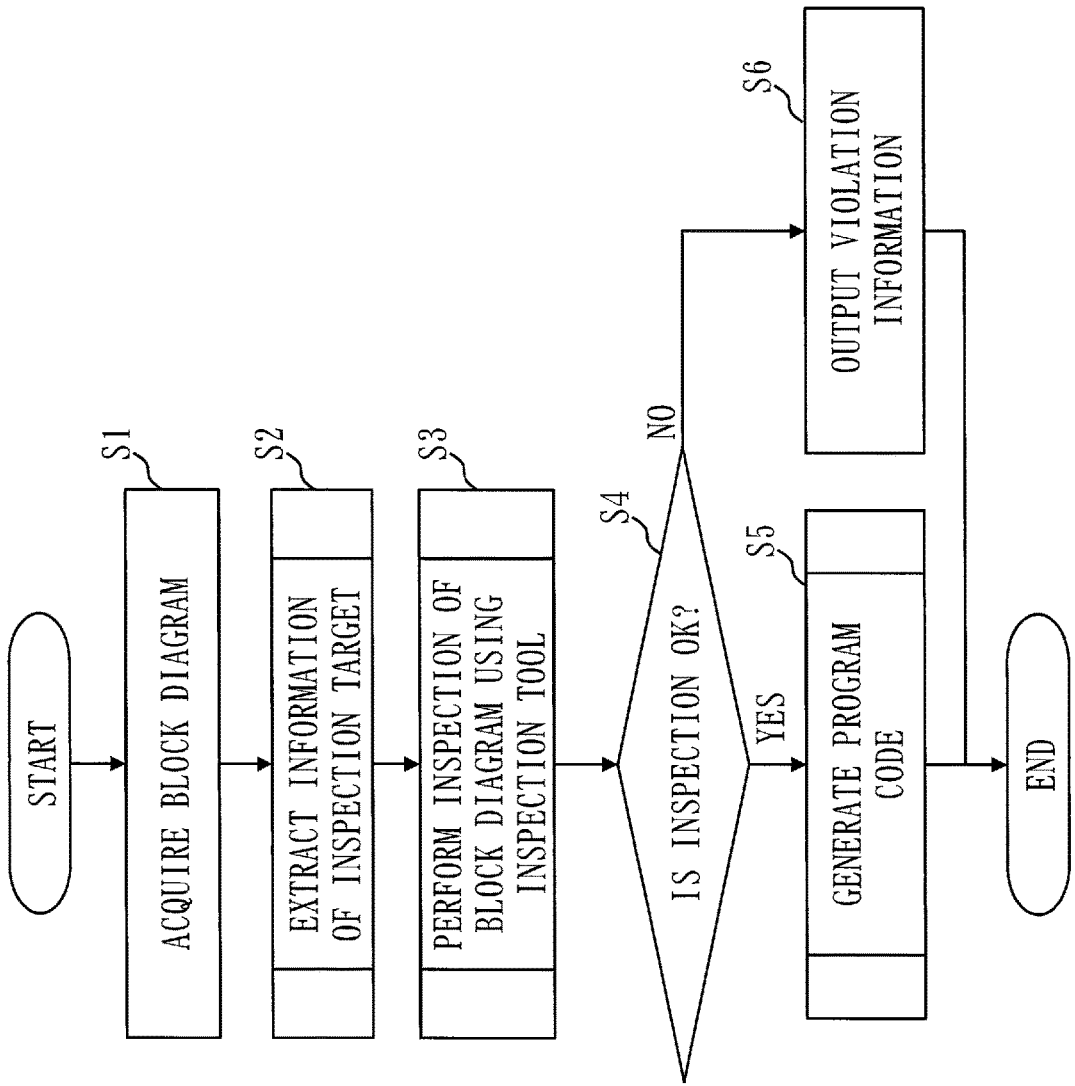
FIG. 2 is a flowchart illustrating an operation example of the program code generation apparatus according to the first embodiment.

Next, details of Steps S2, S3, and S5 illustrated in FIG. 2 are described.

Figure 13:
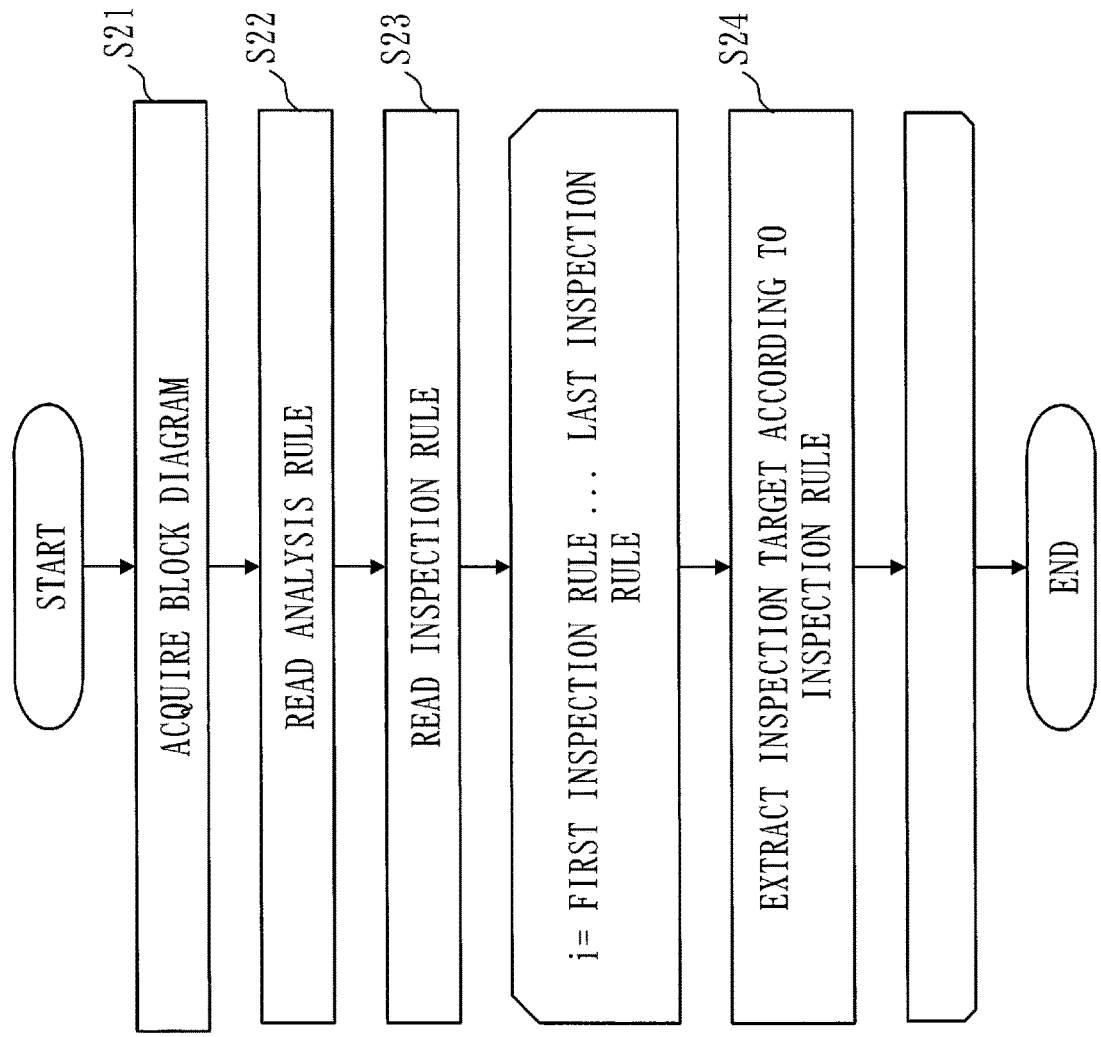
FIG. 13 is a flowchart illustrating an operation example of an inspection-target extraction unit according to the first embodiment.

First, details of Step S2 are described with reference to FIG. 13.

First, the inspection-target extraction unit 14 acquires the block diagram 2 from the block-diagram acquisition unit 11 (Step S21).

Next, the inspection-target extraction unit 14 reads an analysis rule from the block-diagram analysis-rule storage unit 12 (Step S22).

The inspection-target extraction unit 14 then reads an inspection rule from the inspection-rule storage unit 13 (Step S23).

Next, the inspection-target extraction unit 14 extracts an inspection target from the block diagram 2 by using the inspection rule read in Step S23 (Step S24). If a plurality of inspection rules have been read in Step S23, the inspection-target extraction unit 14 performs a process in Step S24 for each inspection rule.

When an inspection target is extracted by using the inspection rule 700 in FIG. 7, the inspection-target extraction unit 14 operates, for example, as described below.

In the Block 711 in FIG. 7, since the starting point 702 is "arbitrary", the inspection-target extraction unit 14 extracts all the blocks as an inspection target. However, the inspection-target extraction unit 14 does not analyze the relationship among the blocks.

In the DataSlice 712, since the starting point 702 is "Output" and the end point 703 is "arbitrary", the inspection-target extraction unit 14 extracts a slice, considering only the data dependence relation, with a block whose block type is "Output" as a starting point.

That is, the inspection-target extraction unit 14 extracts an aggregate of blocks that affect data handled by data processing allocated to the block whose block type is "Output". For example, the inspection-target extraction unit 14 extracts the block B3 and a block B4 as a block having the data dependence relation with a block B9 in FIG. 3. That is, the block B3 and the block B4 are the dependence destination blocks of the block B9.

More specifically, the inspection-target extraction unit 14 extracts the block B3 and the block B4 referring to the analysis rule in FIG. 6. First, the inspection-target extraction unit 14 refers to a row 612 in which the type 601 is "Output" in FIG. 6. Next, the inspection-target extraction unit 14 refers to the number of data inputs 602 in the row 612. In FIG. 6, since the number of data inputs is "one or more", output data from the block whose type is "Output" is affected by other blocks. Therefore, a block connected with the block whose type is "Output" by the connection line has the data dependence relation with the block whose type is "Output".

Therefore, in FIG. 3, the block B3 and the block B4 connected with the block B9 by the connection line are extracted as blocks having the data dependence relation with the block B9. That is, the block B3 and the block B4 are dependence destination blocks of the block B9.

Next, the inspection-target extraction unit 14 checks whether the data dependence relation with respect to each of the block B3 and the block B4 is present.

Since the type of the block B3 is Subsystem, the inspection-target extraction unit 14 refers to the row 614 in FIG. 6. In the row 614, since the number of data inputs 602 is "one or more", it is understood that the block B3 has the data dependence relation with a block that inputs data to the block B3. However, in the case of Subsystem, its entity is in another block diagram, and thus the other block diagram needs to be confirmed. In the case of the block B3, the entity is illustrated in SubA in FIG. 4. The inspection-target extraction unit 14 performs similar analysis with respect to FIG. 4.

The block B34 in FIG. 4 and the block B9 in FIG. 3 have the same ID, and thus these are the same block. In FIG. 4, the block B34 is connected to the block B33.

The type of the block B33 is "Sum". In a row 615 in the analysis rule 600 in FIG. 6, the number of data outputs 603 is "1". Therefore, the block B33 has the data dependence relation with the block B34. That is, the block B33 is the dependence destination block of the block B34 (the block B9).

Further, the block B33 is connected to the block B31 and the block B32. The types of the block B31 and the block B32 are both "Input", and the number of data outputs 603 is "1" in a row 611 in the analysis rule 600 in FIG. 6. Therefore, the block B31 and the block B32 have the data dependence relation with the block B33. That is, the block B31 and the block B32 are the dependence destination block of the block B33.

As described above, since the blocks B31 to B34 in FIG. 3, which are the internal constitution of the block B3, have been analyzed, the inspection-target extraction unit 14 returns to FIG. 3 to continue the analysis.

As a block connected with the block B3 in FIG. 3, there are three blocks, which are the block B2, the block B5, and the block B6. The type of the block B2 is "If", and in a row 613 in the analysis rule 600 in FIG. 6, the number of data outputs 603 is "0". Therefore, the block B3 does not have the data dependence relation with the block B2. That is, the block B2 is not the dependence destination block of the block B3. Further, the types of the block B5 and the block B6 are both "Input", and the number of data outputs 603 is "1" in the row 611 in the analysis rule 600 in FIG. 6. Therefore, the block B5 and the block B6 have the data dependence relation with the block B3. That is, the block B5 and the block B6 are the dependence destination blocks of the block B3. Since In2 in FIG. 3 and In2 in FIG. 4 have the same ID, these are the same block. Similarly, since In3 in FIG. 3 and In3 in FIG. 4 have the same ID, these are the same block. Therefore, the inspection-target extraction unit 14 merges extraction results.

The inspection-target extraction unit 14 analyzes the data dependence relation according to the similar procedure, with regard to the block B4, which is another dependence destination block of the block B9 in FIG. 3.

As a result, the inspection-target extraction unit 14 extracts the block B9, the block B3, the block B5, the block B6, the block B7, and the block B8, and the block B33 in FIG. 4 and the block B43 in FIG. 5 as the data slice of the block B9 in FIG. 3.

The set of the block B9, the block B3, the block B5, the block B6, and the block B33 and the set of the block B9, the block B4, the block B7, the block B8, and the block B43 in FIG. 5 do not affect each other. Therefore, the inspection-target extraction unit 14 manages these sets as different paths.

Next, the inspection-target extraction unit 14 extracts a slice from blocks whose type is "Output" according to the Slice 713 in the inspection rule 700 in FIG. 7.

In this case, the inspection-target extraction unit 14 extracts blocks, also taking the control dependence relation into consideration in addition to the data dependence relation. The control dependence relation with respect to a certain block means an aggregate of outputs of a block that affects execution of the certain block.

For example, a block having the control dependence relation with the block B3 and the block B4 in FIG. 3 is the block B2 in FIG. 3, which is the If block. The inspection-target extraction unit 14 designates, as a slice to be inspected, by adding the block B2 and the block B1 in FIG. 3 to the aggregate of blocks extracted as the data slice described above.

According to the procedure described above, the inspection-target extraction unit 14 can extract the block to be inspected, the slice to be inspected, and a data slice to be inspected.

Figure 14:
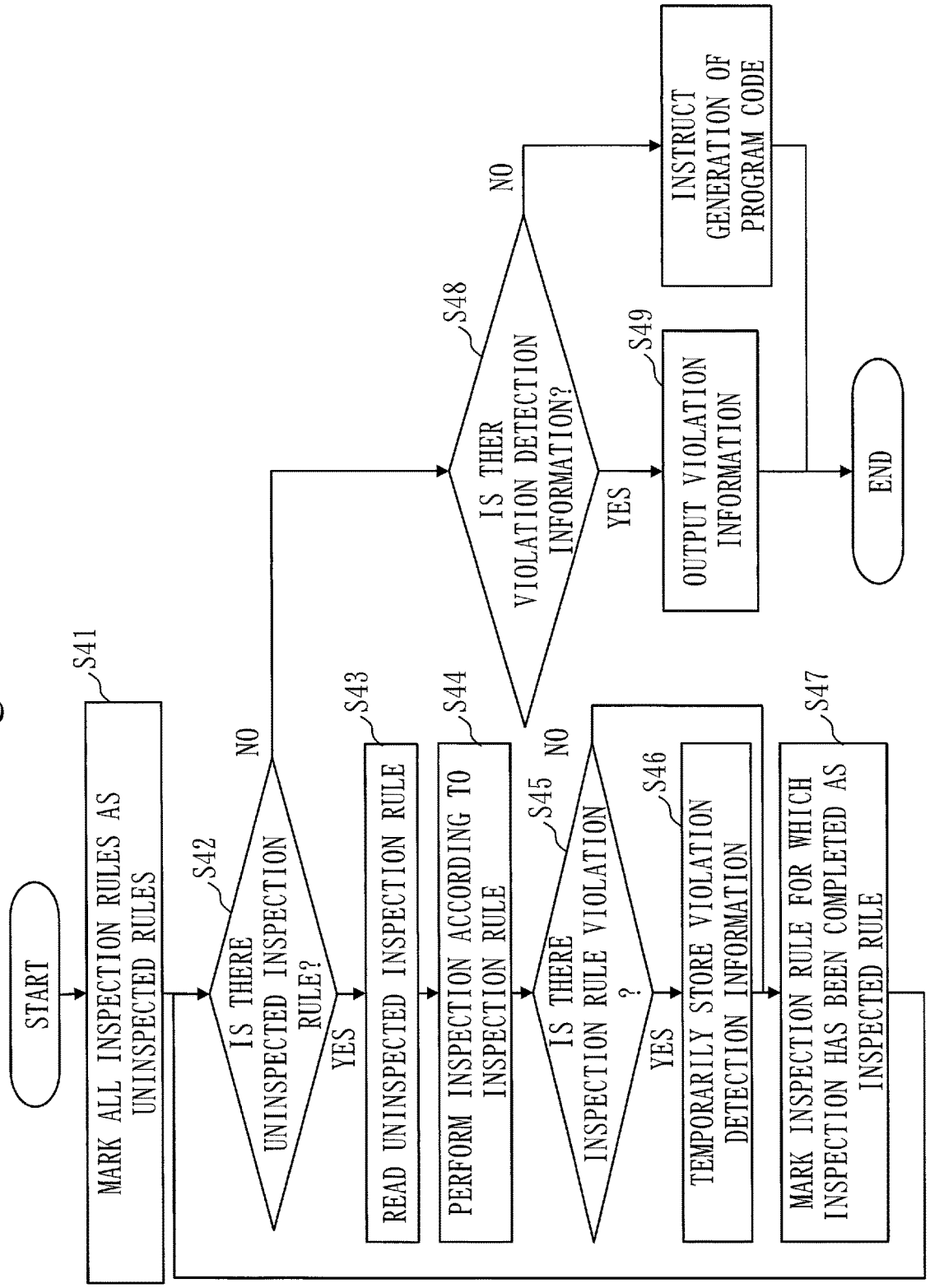
FIG. 14 is a flowchart illustrating an operation example of a block-diagram inspection unit according to the first embodiment.

Next, details of Step S3 in FIG. 2 are described with reference to FIG. 14.

First, the block-diagram inspection unit 15 marks all the inspection rules as uninspected rules (Step S41).

Next, the block-diagram inspection unit 15 confirms whether there is an uninspected inspection rule (Step S42).

If there is an uninspected rule (YES in Step S42), the block-diagram inspection unit 15 reads one of the uninspected inspection rules from the inspection-rule storage unit 13 (Step S43).

Next, the block-diagram inspection unit 15 inspects the block diagram 2 according to the read inspection rule (Step S44).

Specifically, the block-diagram inspection unit 15 applies the inspection rule to the block, the data slice, and the slice extracted by the inspection-target extraction unit 14 to inspect whether there is an inconsistency in the data processing procedure defined in the block diagram 2.

That is, the block-diagram inspection unit 15 inspects whether there is a block in which the DataType has not been set in all the blocks extracted by the inspection-target extraction unit 14, according to a line 711 in the inspection rule 700 in FIG. 7.

Further, the block-diagram inspection unit 15 inspects whether a block having the DataType different from the DataType of the starting block is included in a path, for each path in the data slice extracted by the inspection-target extraction unit 14, according to a line 712 in the inspection rule 700 in FIG. 7.

Further, the block-diagram inspection unit 15 inspects whether Min or Max is different between paths in the slice extracted by the inspection-target extraction unit 14, according to a line 713 in the inspection rule 700 in FIG. 7.

Next, the block-diagram inspection unit 15 confirms whether an inspection rule violation has been detected (Step S45).

If an inspection rule violation has been detected (YES in Step S45), the block-diagram inspection unit 15 temporarily stores details of the inspection rule violation in the main storage device 1903 or the like as violation detection information (Step S46).

For example, the block-diagram inspection unit 15 stores an ID of the inspection rule with which a violation has been detected, an ID of a block in which a violation has been detected, a slice in which a violation has been detected, and a path in which a violation has been detected in the main storage device 1903 or the like as the violation detection information.

Thereafter, the block-diagram inspection unit 15 marks the inspection rule for which inspection has been completed as an inspected rule (Step S47), and the process returns to Step S42.

If processing with respect to one inspection rule has been completed without detecting a violation (NO in Step S45), the block-diagram inspection unit 15 marks the inspection rule for which inspection has been completed as an inspected rule (Step S47), and the process returns to Step S42.

In Step S42, if it is determined that there is no uninspected inspection rule (NO in Step S42), the block-diagram inspection unit 15 confirms whether the violation detection information is present in the main storage device 1903 or the like (Step S48).

If the violation detection information is present (YES in Step S48), the block-diagram inspection unit 15 outputs the violation detection information as the violation information 4 to a display or the like of the input/output device 905 to end the process.

If there is no violation detection information (NO in Step S48), the block-diagram inspection unit 15 instructs the program-code generation unit 17 to generate a program code.

Figure 15:
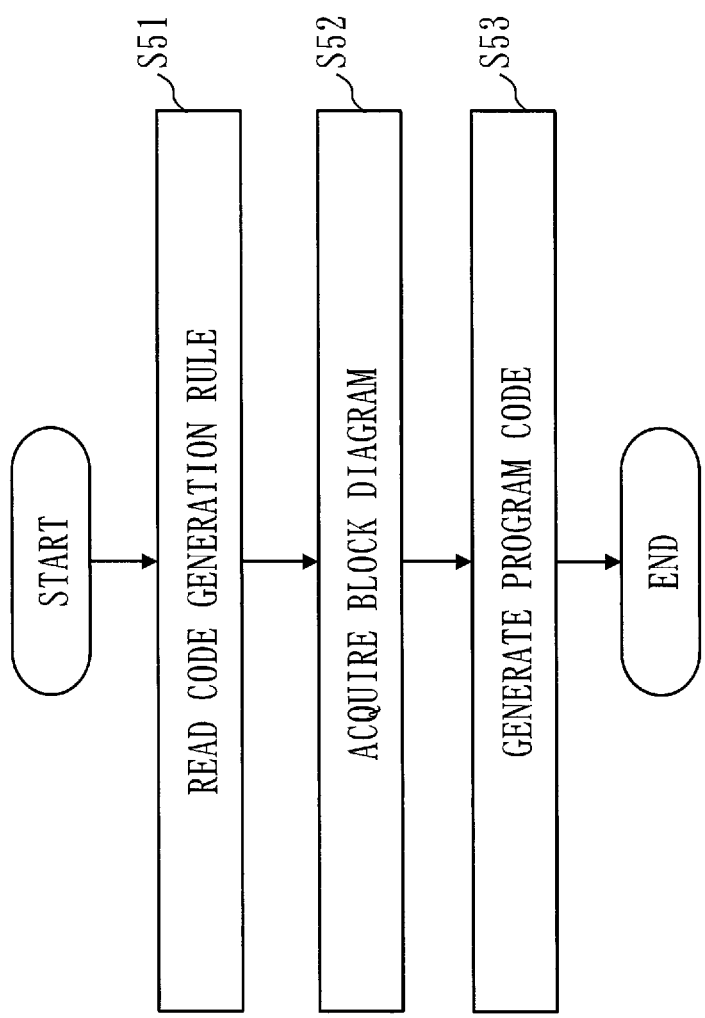
FIG. 15 is a flowchart illustrating an operation example of a program-code generation unit according to the first embodiment.

Next, details of Step S5 in FIG. 2 are described with reference to FIG. 15.

First, the program-code generation unit 17 reads a code generation rule from the code-generation-rule storage unit 16 (Step S51).

Next, the program-code generation unit 17 acquires the block diagram 2 from the block-diagram inspection unit 15 (Step S52).

Next, the program-code generation unit 17 generates the program code 3 from the block diagram 2 by using the code generation rule (Step S53).

In Step S53, for example, when the read code generation rules are the code generation rule 800 in FIG. 8 and the code generation rule 900 in FIG. 9, the program-code generation unit 17 generates a header file and a source file according to the code generation rule 800.

The file name of the header file is the file name in FIG. 2 added with ".h", and the file name of the source file is the file name in FIG. 2 added with ".c". Therefore, when the file name of the block diagram 2 is "sample.blk", the program-code generation unit 17 generates files referred to as "sample.h" and "sample.c".

At this time, the function name of a function included in the "sample.c" is "sample".

The program-code generation unit 17 then defines a structure of input data and a structure of output data of the header file "sample.h".

The program-code generation unit 17 generates the structure of the input data (IN structure) based on the internal data of a block whose type is "Input".

Further, the program-code generation unit 17 generates the structure of the output data (OUT structure) based on the internal data of a block whose type is "Output".

The program-code generation unit 17 generates the program code 1000 (header file) illustrated in, for example, FIG. 10 from the block diagrams in FIGS. 3 to 5.

Further, the program-code generation unit 17 generates a content of the source file "sample.c" according to the code generation rule 900 in FIG. 9.

The program-code generation unit 17 generates the program code 1100 (source file) illustrated in, for example, FIG. 11 from the block diagrams in FIGS. 3 to 5.

\*\*\*Descriptions of Effects of Embodiment\*\*\*

In this manner, according to the present embodiment, it is inspected whether there is an inconsistency in the data processing procedure by tracing connections among the blocks in the block diagram 2. Therefore, according to the present embodiment, an inappropriate block diagram can be detected without preparing patterns of an inappropriate block diagram in advance.

That is, according to the present embodiment, before generating the program code 3 from the block diagram 2, the connection relation among blocks extracted from the block diagram 2 and the structure of set variables and the like are compared. Therefore, a structurally inconsistent part can be detected.

Accordingly, a software developer does not need to search for a part requiring correction, thereby enabling to reduce the time and labor required for software development.

Second Embodiment

In the first embodiment, the data dependence relation and the control dependence relation in the block diagram 2 are extracted, and it is inspected whether there is an inconsistency in the data processing procedure based on the inspection rule.

According to the present embodiment, the block-diagram inspection unit 15 inspects whether there is an inconsistency in a data processing procedure defined in the block diagram 2 by referring to code generation rules 800 and 900, which is referred to by the program-code generation unit 17 in order to generate the program code 3 from the block diagram 2.

Also in the present embodiment, the functional configuration example of the program code generation apparatus 1 is as illustrated in FIG. 1. Further, a hardware configuration example of the program code generation apparatus 1 is as illustrated in FIG. 16.

Except that the block-diagram inspection unit 15 refers to the code generation rules 800 and 900 in addition to the inspection rule 700, the operation of the program code generation apparatus 1 is the same as that of the first embodiment.

According to the present embodiment, a defect depending on a language specification of the program code to be generated can be detected before generating the program code. Therefore, according to the present embodiment, it is not necessary to inspect the generated program code by using a static code analysis tool corresponding to the program language, thereby enabling to save the labor of a developer.

Third Embodiment

In the first and second embodiments, the block diagram 2 is input from outside via the block-diagram acquisition unit 11.

Instead of this, the block diagram 2 can be generated in the program code generation apparatus 1.

In the program code generation apparatus 1 according to the present embodiment, the block-diagram acquisition unit 11 in FIG. 1 generates the block diagram instead of input of the block diagram 2 from outside. That is, according to the present embodiment, the block-diagram acquisition unit 11 acquires the block diagram by generating the block diagram.

A hardware configuration example of the program code generation apparatus 1 is as illustrated in FIG. 16.

Further, in the present embodiment, instead of input of the block diagram 2 from outside, the block-diagram acquisition unit 11 generates the block diagram 2. Operations other than this operation are the same as those described in the first embodiment.

While the above description has been given about the embodiments of the present invention, these three embodiments may be carried out in combination.

Alternatively, one of these three embodiments may be partially carried out.

Alternatively, these three embodiments may be partially combined to be carried out.

The present invention is not limited to these embodiments, and various modifications are possible as necessary.

\*\*\*Descriptions of Hardware Configuration\*\*\*

Finally, supplementary descriptions of a hardware configuration of the program code generation apparatus 1 are provided.

The processor 1901 illustrated in FIG. 16 is an IC (Integrated Circuit) that performs processing.

The processor 1901 is a CPU (Central Processing Unit), a DSP (Digital Signal Processor), and the like.

The auxiliary storage device 1902 is a ROM (Read Only Memory), a flash memory, an HDD (Hard Disk Drive), and the like.

The main storage device 1903 is a RAM (Random Access Memory).

The communication device 1904 includes a receiver that receives data and a transmitter that transmits data.

The communication device 1904 is a communication chip or an NIC (Network Interface Card), for example.

The input/output device 1905 is a mouse, a keyboard, and a display, for example.

Further, an OS (Operating System) is stored in the auxiliary storage device 1902.

At least a part of the OS is loaded to the main storage device 1903 and executed by the processor 1901.

The processor 1901 executes programs for realizing the functions of the block-diagram acquisition unit 11, the inspection-target extraction unit 14, the block-diagram inspection unit 15, and the program-code generation unit 17, while executing at least the part of the OS.

The processor 1901 executes the OS, thereby performing task management, memory management, file management, communication control, and the like.

Further, the program code generation apparatus 1 can include a plurality of processors that substitute for the processor 1901. These processors share execution of programs for realizing the functions of the block-diagram acquisition unit 11, the inspection-target extraction unit 14, the block-diagram inspection unit 15, and the program-code generation unit 17. Respective processors are ICs that perform processing as in the processor 1901.

Information, data, signal values, and variable values indicating results of processing by the block-diagram acquisition unit 11, the inspection-target extraction unit 14, the block-diagram inspection unit 15, and the program-code generation unit 17 are stored in at least any of the storage device 1902, and a register and a cash memory in the processor 1901.

Further, the programs for realizing the functions of the block-diagram acquisition unit 11, the inspection-target extraction unit 14, the block-diagram inspection unit 15, and the program-code generation unit 17 can be stored in a portable storage medium such as a magnetic disk, a flexible disk, an optical disk, a compact disk, a Blu-ray (registered trademark) disk, and a DVD.

The "unit" of the block-diagram acquisition unit 11, the inspection-target extraction unit 14, the block-diagram inspection unit 15, and the program-code generation unit 17 can be replaced with "circuit", "step", "procedure", or "process".

The program code generation apparatus 1 can be realized by an electronic circuit such as a logic IC (Integrated Circuit), a GA (Gate Array), an ASIC (Application Specific Integrated Circuit), and an FPGA (Field-Programmable Gate Array).

In this case, each of the block-diagram acquisition unit 11, the inspection-target extraction unit 14, the block-diagram inspection unit 15, and the program-code generation unit 17 is realized as a part of an electronic circuit.

The processors and the electronic circuit described above are also collectively referred to as "processing circuitry".

REFERENCE SIGNS LIST

1: program code generation apparatus; 2: block diagram; 3: program code; 4: violation information; 11: block-diagram acquisition unit; 12: block-diagram analysis-rule storage unit; 13: inspection-rule storage unit; 14: inspection-target extraction unit; 15: block-diagram inspection unit; 16: code-generation-rule storage unit; 17: program-code generation unit; 18: inconsistency inspection unit; 600: analysis rule; 700: inspection rule; 800: code generation rule; 900: code generation rule; 1000: program code; 1100: program code

The invention claimed is:

1. A program code generation apparatus comprising: processing circuitry to:
acquire a block diagram that defines by connection among a plurality of blocks, a data processing procedure to be reflected in a program code, and in which a processing procedure element being an element of the data processing procedure is allocated to each of the blocks;
set any one of the blocks as a starting block;
extract a block on which the starting block depends as a dependence destination block by tracing the connection among the blocks in the block diagram from the starting block;
repeat an operation to further extract a block on which the extracted dependence destination block depends as a dependence destination block, thereby extracting dependence destination blocks on which the starting block depends directly and indirectly; and
inspect whether there is an inconsistency in any of a data type, a maximum value, and a minimum value between the processing procedure element allocated to the starting block and the processing procedure elements allocated to the extracted dependence destination blocks.

2. The program code generation apparatus according to claim 1,
wherein, when there is the inconsistency in the data processing procedure defined in the block diagram, the processing circuitry outputs violation information notifying of the inconsistency in the data processing procedure.

3. The program code generation apparatus according to claim 1, wherein the processing circuitry generates a program code from the block diagram when there is no inconsistency in the data processing procedure defined in the block diagram.

4. A program code generation apparatus comprising: processing circuitry to:
acquire a block diagram that defines by connection among a plurality of blocks, a data processing procedure to be reflected in a program code, and in which a processing procedure element being an element of the data processing procedure is allocated to each of the blocks;
set any one of the blocks as a starting block;
extract a block on which the starting block depends with regard to data handled by the processing procedure element allocated to the starting block as a dependence destination block by tracing the connection among the blocks in the block diagram from the starting block;
repeat an operation to further extract a block on which the extracted dependence destination block depends with regard to data handled by the processing procedure element allocated to the extracted dependence destination block as a dependence destination block, thereby extracting dependence destination blocks on which the starting block depends directly and indirectly; and
inspect whether there is an inconsistency between a processing procedure element allocated to the starting block and processing procedure elements allocated to the extracted dependence destination blocks.

5. The program code generation apparatus according to claim 4
wherein, when there is the inconsistency in the data processing procedure defined in the block diagram, the processing circuitry outputs violation information notifying of the inconsistency in the data processing procedure.

6. The program code generation apparatus according to claim 4, wherein the processing circuitry generates a program code from the block diagram when there is no inconsistency in the data processing procedure defined in the block diagram.

7. A program code generation apparatus comprising: processing circuitry to:
acquire a block diagram that defines by connection among a plurality of blocks, a data processing procedure to be reflected in a program code, and in which a processing procedure element being an element of the data processing procedure is allocated to each of the blocks;
set any one of the blocks as a starting block;
extract a block on which the starting block depends with regard to control at the processing procedure element allocated to the starting block as a dependence destination block by tracing the connection among the blocks in the block diagram from the starting block;
repeat an operation to further extract a block on which the extracted dependence destination block depends with regard to control at the processing procedure element allocated to the extracted dependence destination block as a dependence destination block, thereby extracting dependence destination blocks on which the starting block depends directly and indirectly; and
inspect whether there is an inconsistency between a processing procedure element allocated to the starting block and processing procedure elements allocated to the extracted dependence destination blocks.

8. The program code generation apparatus according to claim 7,
wherein, when there is the inconsistency in the data processing procedure defined in the block diagram, the processing circuitry outputs violation information notifying of the inconsistency in the data processing procedure.

9. The program code generation apparatus according to claim 7, wherein the processing circuitry generates a program code from the block diagram when there is no inconsistency in the data processing procedure defined in the block diagram.

* * * * *